United States Patent [19]
Rohee

[11] Patent Number: 5,931,436
[45] Date of Patent: Aug. 3, 1999

[54] INSTANTLY LOCKABLE SLIDEWAY

[75] Inventor: René Rohee, Flers, France

[73] Assignee: Bertrand Faure Equipments S.A., Boulogne, France

[21] Appl. No.: 08/967,871

[22] Filed: Nov. 12, 1997

[30] Foreign Application Priority Data

Nov. 14, 1996 [FR] France ................................. 96 13880

[51] Int. Cl.⁶ ................................................. F16M 13/00
[52] U.S. Cl. ......................... 248/430; 248/429; 297/341
[58] Field of Search .................................. 248/429, 424, 248/430, 419, 421; 297/344.1, 341, 331, 317, 318

[56] References Cited

U.S. PATENT DOCUMENTS

| 5,172,882 | 12/1992 | Nini | 248/430 |
| 5,275,370 | 1/1994 | Terai | 248/429 |
| 5,516,071 | 5/1996 | Miyauchi | 248/429 |
| 5,785,291 | 7/1998 | Chang | 248/429 |

FOREIGN PATENT DOCUMENTS

| 0 567 226 A1 | 10/1993 | European Pat. Off. . |
| 0 582 773 A1 | 2/1994 | European Pat. Off. . |
| 43 21 720 A1 | 1/1995 | Germany . |

Primary Examiner—Leslie A. Braun
Assistant Examiner—Long Dinh Phan
Attorney, Agent, or Firm—Marshall, O'Toole, Gerstein, Murray & Borun

[57] ABSTRACT

The slideway comprises first and second section members that are slidable relative to each other, together with a locking mechanism for locking the seat longitudinally, which mechanism comprises four resiliently flexible blades each including teeth suitable for co-operating, in a locking position, with notches formed in the second section member. The first section member has unlocking means suitable for acting simultaneously on all four blades, causing them to bend elastically so that the teeth of all of the blades are disengaged from the notches. The blades are disposed relative to each other in such a manner that in most positions of the first section member relative to the second section member, at least one of the blades meshes with the notches.

9 Claims, 3 Drawing Sheets

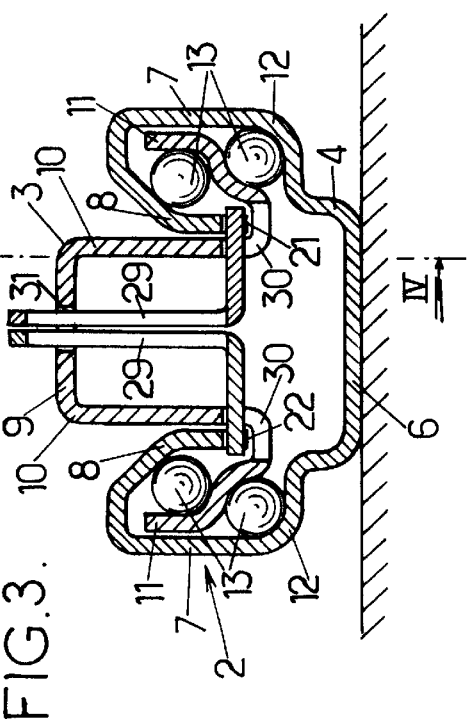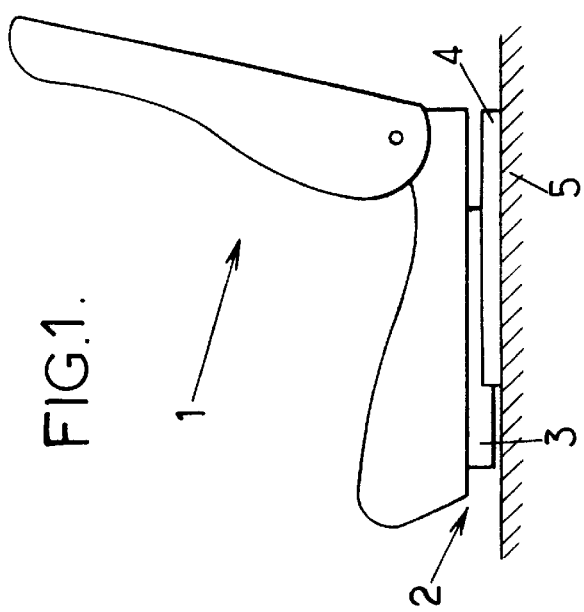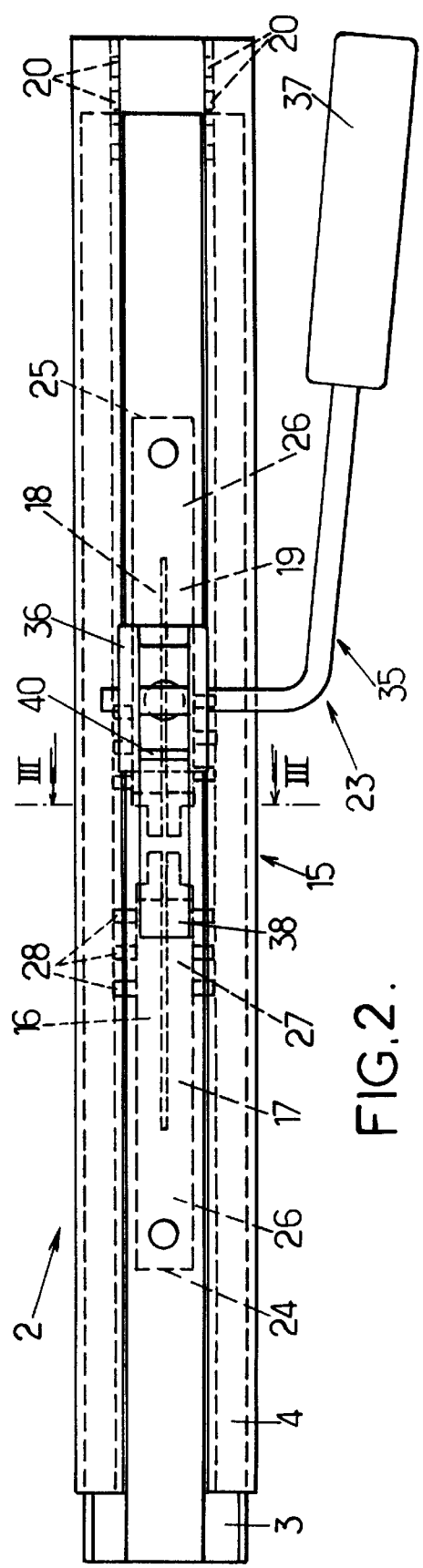

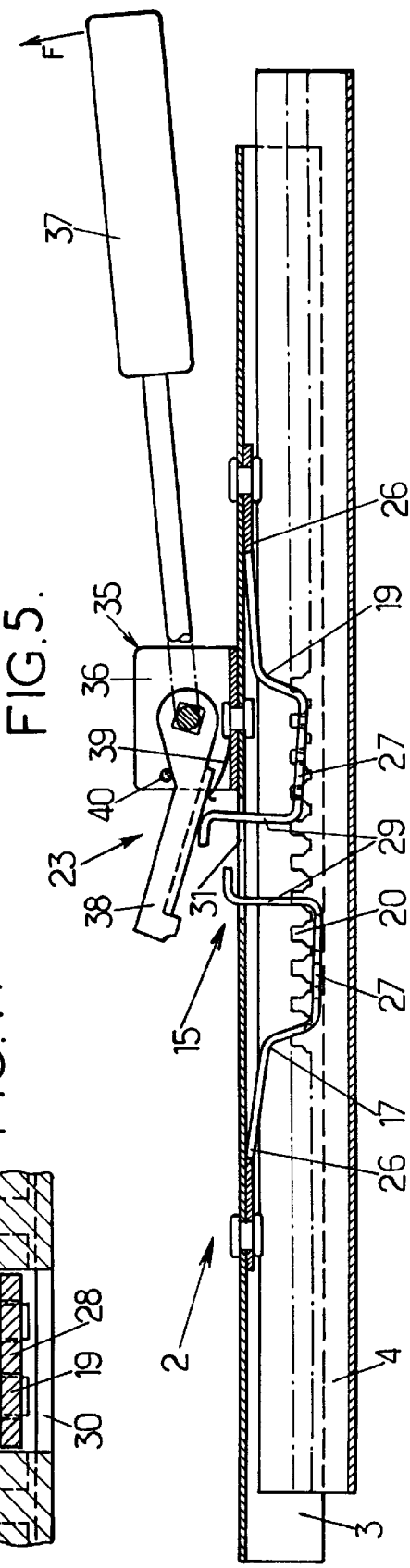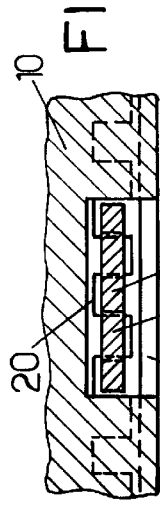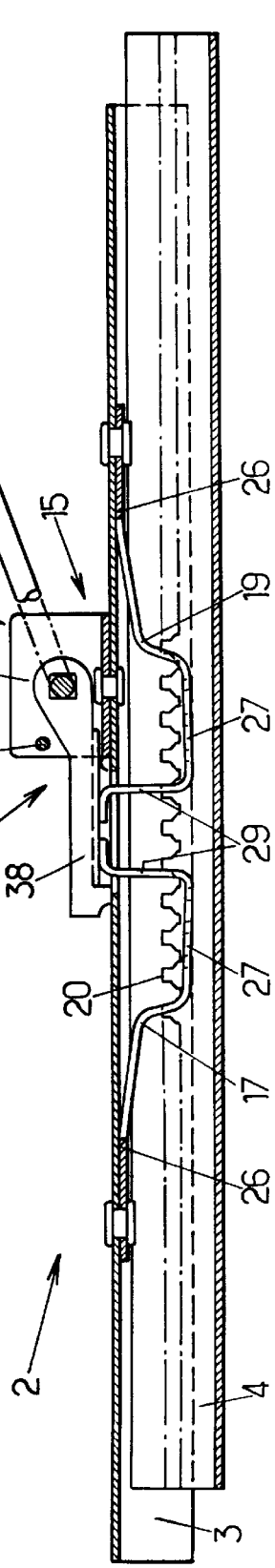

INSTANTLY LOCKABLE SLIDEWAY

FIELD OF THE INVENTION

The present invention relates to a slideway that is lockable in position, in particular a slideway for a motor vehicle seat. Such a slideway is particularly intended for mounting beneath a motor vehicle front seat and for being fixed to the floor of the vehicle to allow the longitudinal position of the seat to be adjusted and then to allow the seat to be locked in position regardless of the selected adjustment position.

BACKGROUND OF THE INVENTION

In general, a slideway comprises first and second section members that slide longitudinally one within the other. The slideway also includes a longitudinal locking mechanism for locking the first section member relative to the second section member in a plurality of locking positions.

Document FR-A-2 395 858 discloses a locking mechanism which comprises at least two blades designed to engage independently of each other in any one of said locking positions with notches of a certain width that are uniformly distributed along at least one rail secured to the second section member, said blades being simultaneously disengageable from said notches by unlocking means.

Unfortunately, although that locking mechanism is capable of effectively preventing the first section member from moving relative to the second section member, engaging and disengaging each of the blades relative to the notches is performed under drive from locking and unlocking means making use of a large number of parts.

OBJECT AND SUMMARY OF THE INVENTION

The object of the present invention is to remedy the above-mentioned drawbacks, and more particularly to provide a locking mechanism that is simple while ensuring positive locking of the first section member on the second section member, and to do so at a locking pitch that is small.

To this end, according to the invention, in a slideway of the above-specified type:

the first section member and the second section member are respective channel section members each having a web and two flanges, the two channel sections being upsidedown relative to each other to define an inside volume, said first section member sliding longitudinally between said flanges of the second section member, each of said at least two blades comprises:
- a first end portion fixed on the first section member in said inside volume; and
- a running portion provided with locking teeth of a width that is substantially equal to the width of the notches, said at least two blades are disposed relative to one another in such a manner as to guarantee, in most relative positions of the first and second section members, that at least one of said blades engages with the notches of said at least one rail, said blades are elastically bendable towards one of the two webs of said section members, and the unlocking means are secured to the first section member and cause said at least two blades to bend elastically, thereby disengaging said locking teeth from said notches.

Thus, the slideway of the present invention has a locking mechanism which makes it possible to ensure positive locking of said slideway in nearly any longitudinal position selected by the user because the blades together provide a locking pitch that is much smaller than the pitch of the notches in said at least one rail.

The slideway of the invention may optionally further include one or more of the following characteristics:

the locking teeth carried by each blade are offset from one blade to another in the longitudinal sliding direction through a distance equal to K×p+p/n where K is an integer, p is the pitch of the notches, and n is the number of blades;

said blades have respective second end portions that pass through a longitudinal window formed in the first section member and that are designed to co-operate with the unlocking means;

said at least two blades are mounted opposite ways round, each blade co-operating, in the locking position, with a series of notches distributed uniformly along the second section member;

said at least two blades are mounted side by side and extend in the same longitudinal direction, each blade co-operating, in the locking position, with a series of notches that are uniformly spaced apart along the second section member;

the locking mechanism comprises two pairs of blades mounted opposite ways round, each pair of blades being made from a piece of sheet metal that is split longitudinally from the second end portion to within the first end portion so as to form four blades that are flexible independently of one another, each co-operating with a series of notches;

the unlocking means comprise an L-shaped bar pivotally mounted on the first section member to move between an unlocking position in which said bar bears simultaneously on all of the second end portions of the blades to disengage said locking teeth from said notches, and a locking position for the blades, with said bar being urged towards said locking position by resilient means, and in which position it does not co-operate with the blades;

the notches are chamfered so as to facilitate engagement of one of said at least two blades, and the amount of chamfer is adapted so that in the locking position only one blade engages in the notches; and the slideway is placed in a reinforcing section member secured to the first section member and partially covering the second section member, and possessing an opening formed in register with the window of the first section member.

BRIEF DESCRIPTION OF THE DRAWINGS

An embodiment of the invention is described below with reference to the accompanying drawings, in which:

FIG. 1 is a side view of a motor vehicle seat carried by two slideways of the present invention (only one slideway being shown);

FIG. 2 is a plan view of a slideway of the present invention;

FIG. 3 is a section view on line III—III of FIG. 2;

FIG. 4 is a fragmentary view in section on line IV—IV of FIG. 3, showing a locking position of the slideway;

FIGS. 5 and 6 are longitudinal section views of the FIG. 2 slideway, respectively in its locking position and in its unlocking position;

MORE DETAILED DESCRIPTION

Figure 7:
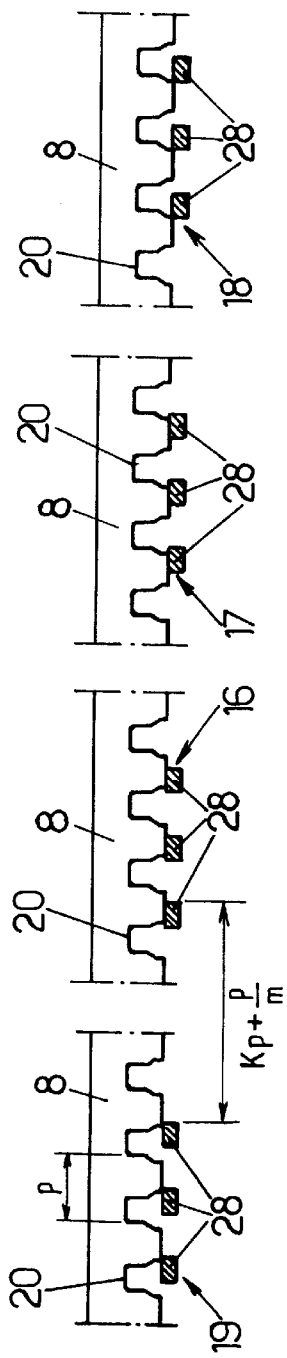
FIGS. 7 and 8 are fragmentary section views of the blades of the FIG. 2 slideway, respectively in the locking position and in the unlocking position.

A motor vehicle seat 1 and more particularly a front seat is shown in FIG. 1. This front seat slides on a system of two parallel slideways 2, only one of these two identical slideways being shown in the figures.

The slideway 2 shown in FIGS. 1 to 6 is constituted by a first or male section member 3 slidable in a second or female section member 4. The male section member 3 is designed to be fixed on the strength member (not shown) of the seat 1, and the female section member 4 is designed to be fixed to the floor 5 of the motor vehicle.

The female section member 4 is a generally channel section member, being open upwards, comprising a web 6 and two flanges 7 that are folded over towards each other and that terminate in hook-shaped flaps 8 extending inwards and downwards relative to the section member.

The male section member 3 is also a generally channel section member, being downwardly open, such that the two section members are opposite-ways up to define an inside volume. The male section member 3 has a web 9 and two flanges 10 which are extended outwards and upwards by respective flaps 11 which engage under the hook-shaped flaps 8 of the female section member 4. The flanges 7 and the web 6 of the female section member have rounded inside angles 12 which co-operate with the flange flaps 8 of the female section member and with the flange flap 11 of the male section member to form ball races for balls 13 which are interposed therebetween so as to make it easy for the male section member 3 to slide in the female section member 4.

The slideway 2 also has a longitudinal locking mechanism 15 for locking the male section member 3 to the female section member 4 in a plurality of locking positions, which mechanism is described below with reference to FIGS. 2 to 8.

The locking mechanism 15 comprises four blades 16 to 19 designed to engage independently of one another in a locking position with notches 20 that are uniformly distributed at a predetermined pitch p along two rails 21 and 22 integral with or secured to the female section member 4, said blades 16 to 19 being simultaneously disengageable from said notches 20 by unlocking means 23 carried by the male section member 3.

Each of the blades 16 to 19 is a flexible blade disposed longitudinally inside the slideway 2. Pairs of blades 16 & 17 and 18 & 19 are made from two pieces of sheet metal 24 and 25 made of spring steel and split longitudinally over a portion of their lengths.

Each blade 16 to 19 has a first end portion 26 secured to the male section member 3 in its inside volume, for example being fixed to the web 9 of said section member by rivets, and sloping diagonally downwards, i.e. towards the web 6 of the female section member 4. A running portion 27 of each blade extends substantially longitudinally and is extended laterally by locking teeth 28. This running portion is terminated by a second end portion 29 extending substantially perpendicularly to the longitudinal direction of the slideway 2 and passing through the male section member 3 via a longitudinal window 31 formed through the web 9 of said section member.

Each of the blades 16 to 19 has teeth 28 only on its edge that is adjacent to the flaps 8 of the female section member 4. The teeth 28 extend laterally beyond the flanges 10 of the male section member 3, passing through windows 30 formed for this purpose in said flanges, and engaging in the notches 20 carried by the rails 21 and 22 integrally formed with the respective flaps 8 of the flanges 7 of the female section member 4. Where appropriate, the teeth 28 may be constituted by a horizontal strip pierced by holes which separate the teeth from one another. In addition, the teeth 28 of any given blade are uniformly spaced apart at a pitch that is identical to the pitch p of the notches 20.

In this way, the blades 16 to 19 are mounted in pairs facing in opposite directions and have locking teeth 28 of width substantially equal to the width of the notches 20 of the female section member 4. When a blade is in the locking position, such as the blade 19 shown on the right-hand side of FIG. 5, the running portion 27 of the blade passes through the window 30 and its teeth 28 engage in the notches 20 of the female section member 4. Given that the flanges of the male section member 3 are situated practically against the flange flaps 8 of the female section member 4, any forces tending to cause the male section member 3 to slide relative to the female section member 4 give rise solely to shear stresses within the teeth 28, which stresses are easily withstood by the steel from which the blades are made.

Also, the second end portions 29 of the blades are of sufficient length to enable them, when in the locking position, to project sufficiently above the web 9 of the male section member 3 to be able to co-operate with the unlocking means 23 to cause the blades to bend elastically, thereby moving them into the unlocking position as shown in FIG. 6 in which the teeth 28 are disengaged from the notches 20.

The unlocking means 23 shown in FIGS. 2, 5, and 6 comprise an L-shaped lever 35 pivotally mounted on a base 36 itself fixed to the male section member 3. The L-shaped lever 35 has an unlocking handle 37 and a limb 38 at an angle to the handle 37. The limb 38 is urged upwards, i.e. away from the male section member 3, by a return spring 39 which bears against said section member 3. The base 36 carries an abutment 40 limiting upward rotation of the branch 38 and consequently overall rotation of the L-shaped lever 35.

By acting on the unlocking handle 37 in the direction of arrow F shown in FIGS. 5 and 6, the limb 38 of the L-shaped lever 35 is pivoted towards the male section member 3 and bears against the second end portions 29 of all of the blades 16 to 19, thereby causing all of said blades to bend downwards. This disengages the teeth 28 from the notches 20 and releases the male section member 3 relative to the female section member 4. The user can then adjust the longitudinal position of the seat.

Figure 8:
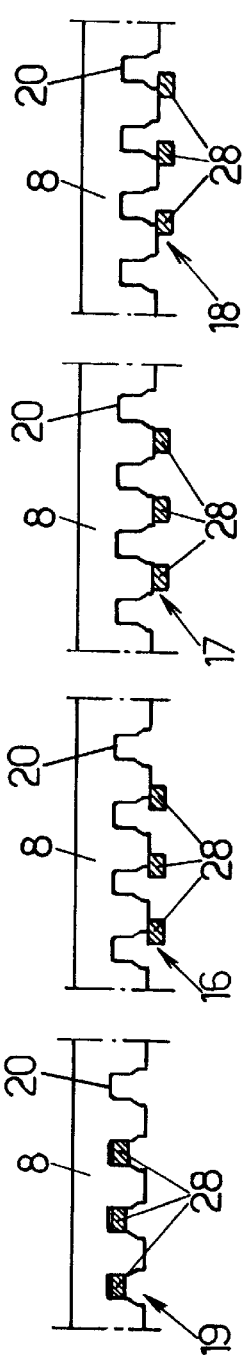

Also, each of the four blades 16 to 19 has a set of teeth 28 that is offset relative to the other sets of teeth so as to obtain a locking pitch that is smaller than the pitch p of the notches, as shown in FIGS. 2, 7, and 8. From left to right in FIGS. 7 and 8, there can be seen the teeth 28 respectively of the blades 19, 16, 17, and 18 co-operating with the flanges 8 of the female section member 4.

The locking teeth 28 carried by each blade are offset from one blade to another in the longitudinal sliding direction through a distance equal to K×p+p/n where K is an integer and n is the number of blades.

Thus, when the teeth of one of the blades, e.g. the blade 19 as shown in FIGS. 4, 5, and 8, engage with the notches 20 of the flap 8 on the female section member 4, the teeth 28 of the other three blades 16 to 18 are situated in intermediate positions between the notches 20 such that none of these three blades engages with the notches, and all three of them remain unlocked.

In this way, in the present case where four flexible blades are used, it will readily be understood that the locking pitch is equal to p/4 even though the notches are at a pitch p.

In addition, each of the notches 20 is chamfered to facilitate engagement of the teeth 28 in the notches 20. The chamfers of the notches 20 are of a size such that when none of the four blades engages, then the overlap zone between the teeth of the blade which is going to engage with the notches once the seat has been moved a little, is itself minimal.

When a user has not locked the seat properly, i.e. when the user releases the handle 37 with the seat placed in a longitudinal position such that none of the blades 16 to 19 can engage in the notches 20 (FIG. 7), it suffices to cause the seat to move by an amount that is much less than one-fourth of the pitch of the notches to ensure that one of the four blades can indeed engage with the notches, thereby locking the seat.

The particular disposition of the sets of teeth on the various blades thus makes it possible to multiply the number of longitudinal positions in which the seat can be locked so that the male section member has no slack relative to the female section member. This makes it possible to minimize the forces generated on the locking teeth when the motor vehicle is braking hard. This disposition is even more advantageous when the seat belt (not shown) has at least one of its three anchor points fixed to the seat.

Figure 9:
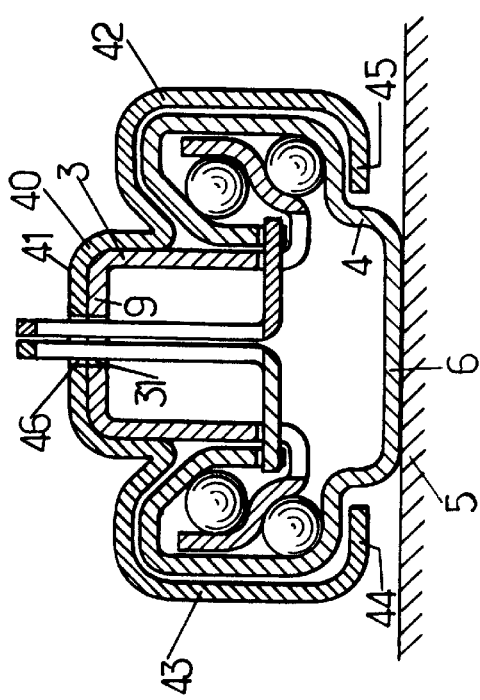
FIG. 9 shows a variant of the slideway shown in FIG. 3.

Finally, in the variant shown in FIG. 9, the slideway 2 is placed in a reinforcing section member 40. This section member is a channel section member with a web 41 fixed on the web 9 of the male section member 3, with two flanges 42 and 43 extending downwards on either side of the female section member 4, and with two flaps 44 and 45 partially engaged beneath the web 6 of the female section member 4. In the web 41 of the reinforcing section member 40 there is provided a longitudinal opening 46 in register with the window 31 in the male section member 3. This section member 40 further improves the strength of the slideway 2 and is particularly advantageous when the seat belt is fixed to the seat.

I claim:

1. A slideway, in particular for a motor vehicle seat, the slideway comprising a first section member and a second section member that are slidable relative to each other in a longitudinal direction, and a locking mechanism for locking the first section member longitudinally relative to the second section member in a plurality of locking positions, said locking mechanism having at least two blades designed, in a locking position, to engage independently of one another with notches of a certain width that are uniformly distributed along at least one rail secured to the second section member, said blades being simultaneously disengageable from said notches by unlocking means, wherein the first section member and the second section member are respective channel section members each having a web and two flanges, the two channel sections being upsidedown relative to each other to define an inside volume, said first section member sliding longitudinally between said flanges of the second section member, wherein each of said at least two blades comprises:
a first end portion fixed on the first section member in said inside volume; and
a running portion provided with locking teeth of a width that is substantially equal to the width of the notches, wherein said at least two blades are disposed relative to one another in such a manner as to guarantee, in most relative positions of the first and second section members, that at least one of said blades engages in the notches of said at least one rail, wherein said blades are elastically bendable towards one of the two webs of said section members, and wherein the unlocking means are secured to the first section member and cause said at least two blades to bend elastically, thereby disengaging said locking teeth from said notches.

2. A slideway according to claim 1, in which the locking teeth carried by each blade are offset from one blade to another in the longitudinal sliding direction through a distance equal to K×p+p/n where K is an integer, p is the pitch of the notches, and n is the number of blades.

3. A slideway according to claim 1, in which said blades have respective second end portions that pass through a longitudinal window formed in the first section member and that are designed to co-operate with the unlocking means.

4. A slideway according to claim 1, in which said at least two blades are mounted opposite ways round, each blade co-operating, in the locking position, with a series of notches distributed uniformly along the second section member.

5. A slideway according to claim 1, in which said at least two blades are mounted side by side and extend in the same longitudinal direction, each blade co-operating, in the locking position, with a series of notches that are uniformly spaced apart along the second section member.

6. A slideway according to claim 1, in which the locking mechanism comprises two pairs of blades mounted opposite ways round, each pair of blades being made from a piece of sheet metal that is split longitudinally from the second end portion to within the first end portion so as to form four blades that are flexible independently of one another, each co-operating with a series of notches.

7. A slideway according to claim 3, in which the unlocking means comprise an L-shaped bar pivotally mounted on the first section member to move between an unlocking position in which said bar bears simultaneously on all of the second end portions of the blades, to disengage said locking teeth from said notches, and a locking position for the blades, with said bar being urged towards said locking position by resilient means, and in which position it does not co-operate with the blades.

8. A slideway according to claim 1, wherein the notches are chamfered so as to facilitate engagement of one of said at least two blades, and the amount of chamfer is adapted so that in the locking position only one blade engages in the notches.

9. A slideway according to claim 3, in which the slideway is placed in a reinforcing section member secured to the first section member and partially covering the second section member, and possessing an opening formed in register with the window of the first section member.

* * * * *